(12) United States Patent
Xing et al.

(10) Patent No.: US 12,543,910 B2
(45) Date of Patent: Feb. 10, 2026

(54) VACUUM CLEANER HEAD

(71) Applicant: Suzhou Rongxuan Electric Co., Ltd, Suzhou (CN)

(72) Inventors: Tianbo Xing, Suzhou (CN); Jundong Xing, Suzhou (CN)

(73) Assignee: Suzhou Rongxuan Electric Co., Ltd, Suzhou (CN)

( * ) Notice: Subject to any disclaimer, the term of this patent is extended or adjusted under 35 U.S.C. 154(b) by 0 days.

(21) Appl. No.: 19/274,677

(22) Filed: Jul. 21, 2025

(65) Prior Publication Data
US 2025/0344924 A1    Nov. 13, 2025

(30) Foreign Application Priority Data

May 28, 2025    (CN) .......................... 202510699805.8

(51) Int. Cl.
| | |
|---|---|
| *A47L 9/30* | (2006.01) |
| *A47L 9/28* | (2006.01) |
| *F21V 5/04* | (2006.01) |
| *F21V 15/01* | (2006.01) |
| *F21Y 103/10* | (2016.01) |
| *F21Y 113/00* | (2016.01) |

(52) U.S. Cl.
CPC .............. *A47L 9/30* (2013.01); *A47L 9/2889* (2013.01); *F21V 5/04* (2013.01); *F21V 15/01* (2013.01); *F21Y 2103/10* (2016.08); *F21Y 2113/00* (2013.01)

(58) Field of Classification Search
CPC . A47L 9/2889; A47L 9/30; F21V 5/04; F21V 15/01

USPC ...................... 15/324; 362/91, 109, 234, 253
See application file for complete search history.

(56) References Cited

U.S. PATENT DOCUMENTS

| | | | | |
|---|---|---|---|---|
| 2,575,554 | A * | 11/1951 | Langille .................... | A47L 9/30 15/325 |
| 5,107,565 | A * | 4/1992 | Chun ........................ | A47L 9/30 362/307 |
| 5,896,618 | A * | 4/1999 | Woo .......................... | A47L 9/30 15/377 |
| 8,826,489 | B2 * | 9/2014 | Oh .......................... | A47L 9/0416 15/322 |
| 2010/0306953 | A1 | 12/2010 | Chan | |
| 2016/0213215 | A1 | 7/2016 | Voorhorst et al. | |
| 2018/0289226 | A1 | 10/2018 | De Wit | |
| 2020/0187735 | A1* | 6/2020 | Jadonath .................. | A47L 9/30 |
| 2024/0374104 | A1* | 11/2024 | Jang ........................ | A47L 11/34 |

* cited by examiner

*Primary Examiner* — Thomas M Sember
(74) *Attorney, Agent, or Firm* — Zhigang Ma (57) ABSTRACT

The present disclosure discloses a vacuum cleaner head. The vacuum cleaner head of the present disclosure includes a lamp disposed on a front side of the vacuum cleaner head, the lamp includes a light source and a protective cover disposed on an outer side of the light source and further includes a lampshade disposed on a front side of the light source, the lampshade is disposed on the protective cover, the lampshade includes a first light gathering portion, one lampshade is disposed corresponding to each light source, and the quantity of values of curvature of an outer surface of each first light gathering portion is greater than or equal to 1. By utilizing the vacuum cleaner head of the present disclosure, a user can conveniently and more clearly observe dust on the surface to be cleaned within a large range.

10 Claims, 11 Drawing Sheets

VACUUM CLEANER HEAD

TECHNICAL FIELD

The present disclosure relates to the technical field of vacuum cleaners, in particular to a vacuum cleaner head.

BACKGROUND OF THE INVENTION

To facilitate observation of dust on a surface to be cleaned by a user, lamps used for observation of dust are typically installed on a front side of a vacuum cleaner head. Considering a size of the vacuum cleaner head and the need to minimize power consumption, a light source for the vacuum cleaner head is usually chosen to have lower power. A focusing structure is required to ensure that the light beams from the light source adequately illuminates the dust on the surface to be cleaned.

Currently, most of them are realized by installing a convex lens-shaped light gathering structure used for focusing on a front side of a lamp bead. In order to minimize the loss of brightness and intensity of light, a dust cover region directly in front of the convex lens-shaped light gathering structure is usually hollowed out, i.e., the region of the dust cover corresponding to the convex lens-shaped structure is provided with an accommodating hole for the structure to be exposed. However, gaps are inevitably formed between the light gathering structure and the accommodating hole, thereby causing dust to easily enter the lamps and affecting the service life of the lamps.

Figure 7:
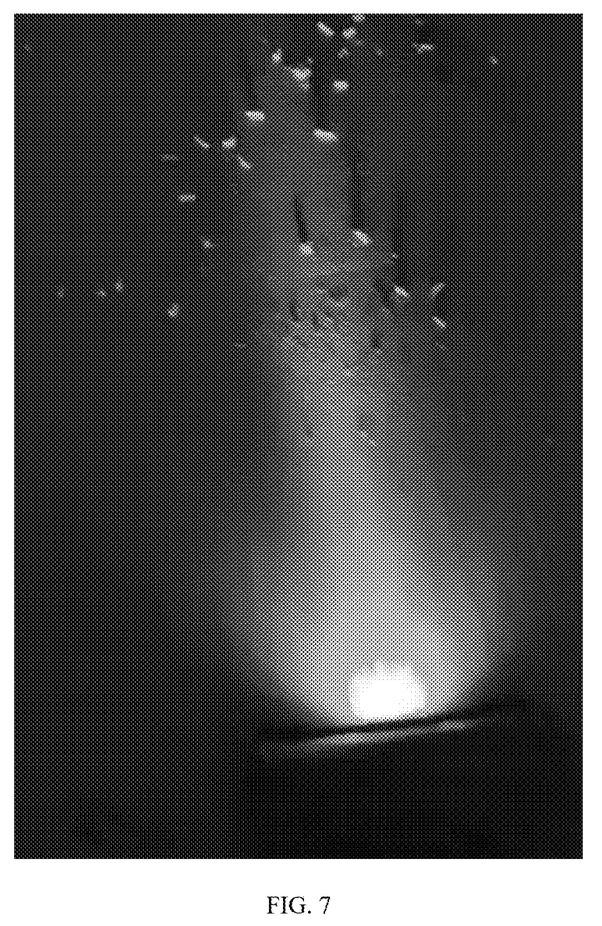
FIG. 7 is a diagram of an effect of illuminating floor dust by a lamp of a vacuum cleaner head in the prior art.

In addition, the lamps disposed on the front side of an existing vacuum cleaner realize the same range, angle of illumination or brightness of light beams. Therefore, only a sheet-like light-emitting region can be formed on the front of the vacuum cleaner (as shown in FIG. 7), and the light beams are still not sufficiently gathered, and thus, the finer dust on the surface to be cleaned still cannot be observed clearly.

SUMMARY OF THE INVENTION

In order to solve the above technical problems, the present disclosure provides a vacuum cleaner head. The vacuum cleaner head includes a lamp, the lamp is disposed on a front side of the vacuum cleaner head, the lamp includes a light source and a protective cover disposed on an outer side of the light source, and each light source is disposed in a width direction of a vacuum cleaner. The lamp further includes a lampshade disposed on a front side of the light source, the light source and the lampshade are disposed sequentially in a first direction, the lampshade is disposed on the protective cover, the lampshade includes a first light gathering portion, an outer surface of the first light gathering portion is bent towards a side away from the light source, the quantity of the light source is n, n≥1, one lampshade is disposed corresponding to each light source, and the quantity of values of curvature of the outer surface of each first light gathering portion is greater than or equal to 1.

The present application has the following beneficial effects:

(1) According to the vacuum cleaner head of the present application, a light gathering structure similar to a convex lens is formed by disposing the first light gathering portion of the lampshade on the protective cover and bending the outer surface of the first light gathering portion towards the side away from the light source, and thus the light gathering structure can be formed only in the process of fabricating the protective cover, which is convenient to fabricate the lampshade. Moreover, the lampshade is externally disposed on the protective cover, so that when the protective cover is disposed on an exterior of the light source, no gap appears on the protective cover at the lampshade, it is ensured that the light source and the external environment are sufficiently isolated, the entry of dust into the lamp of the vacuum cleaner head is effectively reduced, and the service life of the vacuum cleaner head is prolonged.

(2) The quantity of values of curvature of the outer surface of each first light gathering portion of the present application is greater than or equal to 1. Therefore, when the curvature of the lampshade is initially fabricated, the first light gathering portions with different curvatures are fabricated according to the actual use needs, thereby realizing a diversified light beam emitting effect, so that in the event of the quantity of light sources exceeding 1, if the quantity of values of curvature is set to be greater than 1, the lamps may be able to emit light beams with different brightnesses or ranges, and thus the user can conveniently and more clearly observe the dust on a surface to be cleaned. On the basis of the structure in which the lampshade is disposed on the protective cover in the present application, it is convenient to fabricate the first light gathering portions of diversified curvature.

Further, a distance between any one light source and the corresponding lampshade is d, and the quantity of values of d is greater than or equal to 1. Therefore, the light beams emitted through the lampshade have different ranges or light beam gathering effects, which meets the requirements of more diversified applications of different emitted light beams.

Furthermore, the vacuum cleaner head further includes a second light gathering portion, the second light gathering portion is provided with a light gathering cavity extending in the first direction, the first light gathering portion is disposed at an end of the light gathering cavity proximate to the light source, and a circumferential edge of the first light gathering portion is connected to the light gathering cavity. Therefore, under the action of the second light gathering portion, the scattered light beams that still exist after passing through the first light gathering portion are further focused, so that the range of the light beams can be increased, the brightness is high, and the user can observe fine particles on the surface to be cleaned.

Furthermore, the first light gathering portion is located inside the light gathering cavity. Therefore, the light gathering cavity can sufficiently gather the light beams scattered through the first light gathering portion and then the light beams are gathered and emitted from the end of the light gathering cavity away from the light source.

Furthermore, at least an inner cavity wall of the light gathering cavity is made of a reflective material. Here, it does not mean that a specialized reflective coating or other material needs to be specially disposed on the inner cavity wall of the light gathering cavity, as long as it is ensured that the inner cavity wall of the light gathering cavity has light reflecting or refracting properties. For example, the effect of gathering light beams scattered through the first light gathering portion can be realized by using an opaque material to prepare the light gathering cavity, or by using an opaque material to prepare the inner cavity wall of the light gathering cavity.

Furthermore, a circumferential edge of the first light gathering portion is disposed on an outer surface of the lampshade.

In the figures,

1, Light source; 2, Protective cover; 21, Lampshade; 211, First light gathering portion; 212, Second light gathering portion; 2121, Light gathering cavity; 3, Mold; 31, First light gathering cavity; 32, Second light gathering cavity; and 4, Vacuum cleaner head.

DETAILED DESCRIPTION OF THE INVENTION

The preferred embodiments of the present disclosure are described in detail below in conjunction with the accompanying drawings, so that the advantages and features of the present disclosure may be more easily understood by those skilled in the art and thus make a clearer definition on the scope of protection of the present disclosure.

Embodiment 1

Referring to FIG. 1 to FIG. 7, the present embodiment is a vacuum cleaner head 4 including at least one lamp, and further including a back plate. A light source 1 is disposed on the back plate, and the lamp is disposed on a front side of the vacuum cleaner head 4.

Figure 1:
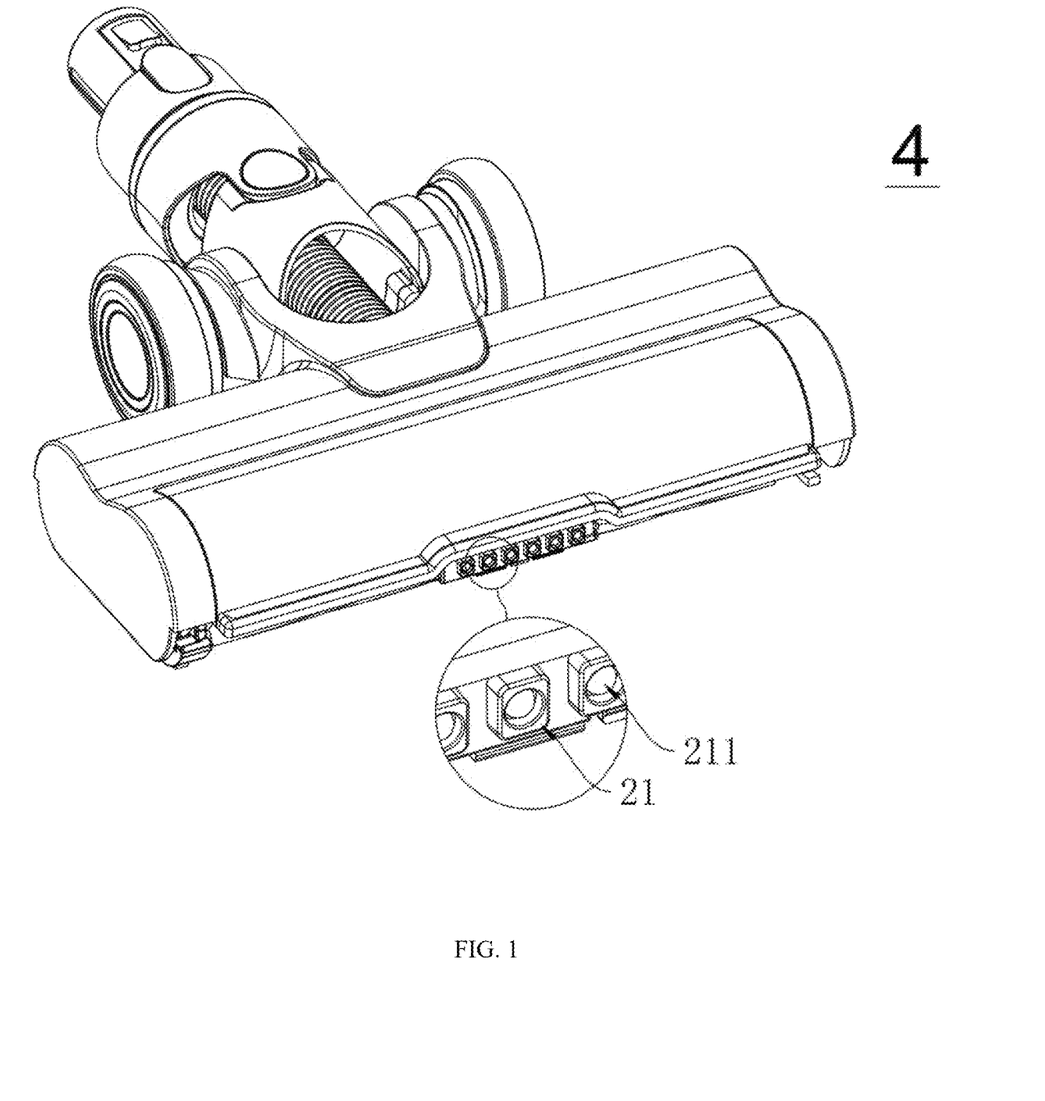
FIG. 1 is a schematic stereoscopic structural diagram of a vacuum cleaner head according to an embodiment of the present disclosure.
Figure 2:
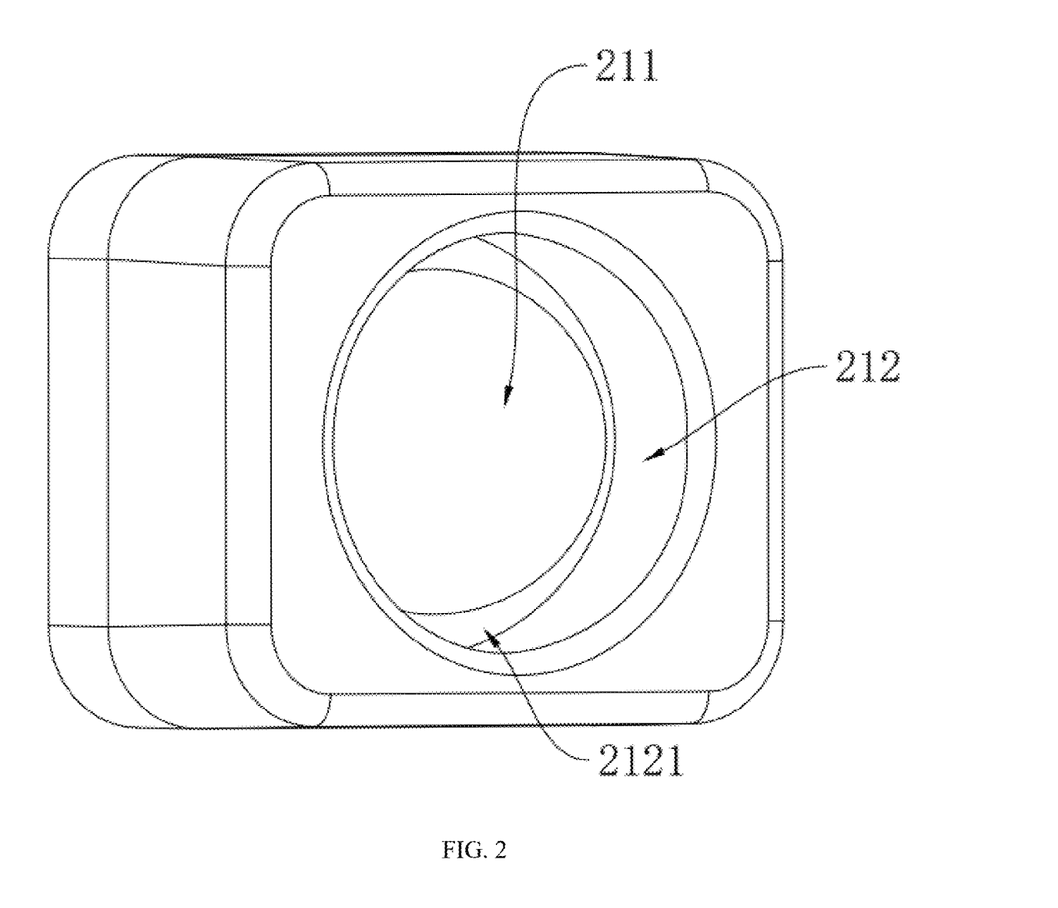
FIG. 2 is a schematic stereoscopic structural diagram of a lamp of a vacuum cleaner head according to an embodiment of the present disclosure.
Figure 3:
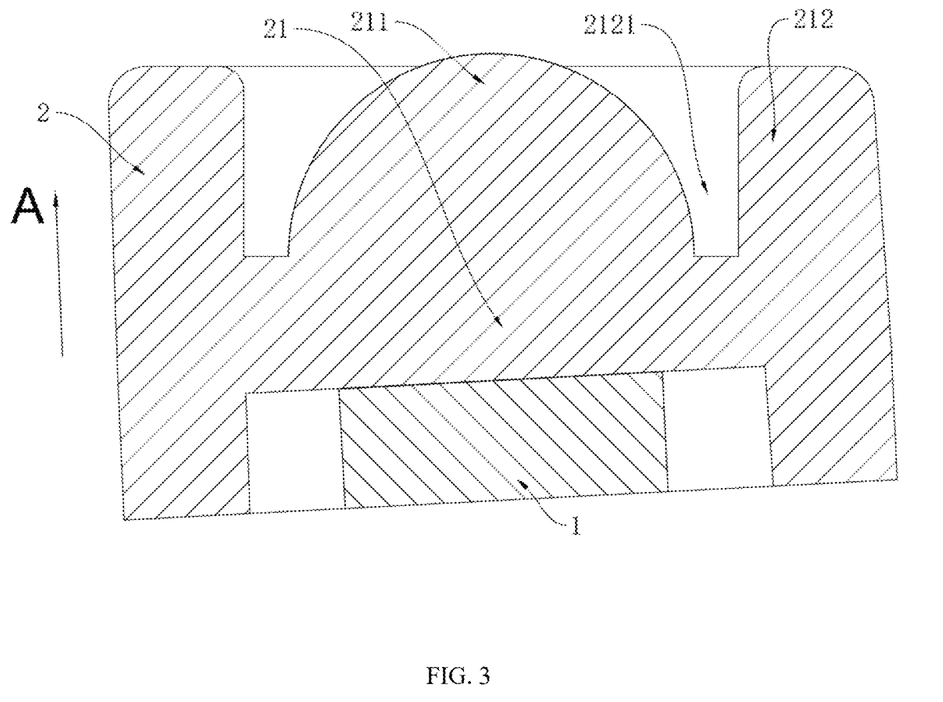
FIG. 3 is a schematic structural sectional view of a lamp of a vacuum cleaner head according to an embodiment of the present disclosure.
Figure 4:
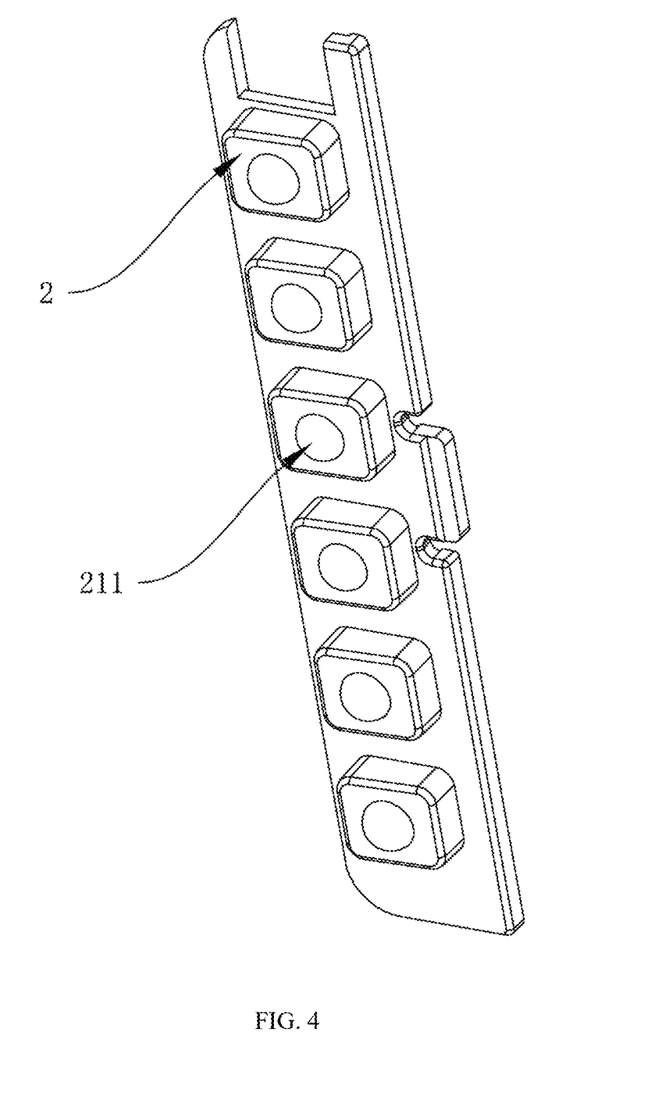
FIG. 4 is a schematic stereoscopic structural diagram of a deformed manner of a lamp of a vacuum cleaner head according to an embodiment of the present disclosure.

The lamp of the vacuum cleaner head 4 includes a light source 1 and a protective cover 2 disposed on an outer side of the light source 1, a lampshade 21 is disposed on the protective cover 2 and located on a front side of the light source 1, and the light source 1 and the lampshade 21 are disposed sequentially in the first direction. Referring to FIG. 3, if a target irradiation direction of the lamp is a direction pointed to by the arrow A in the figure, the light source 1 and the lampshade 21 are disposed sequentially in the direction pointed to by the arrow A, and the direction pointed to by the arrow A is also a first direction. The first direction may be a direction directly in front of the light source 1 or a direction diagonally to the front.

The lampshade 21 of the present embodiment includes a first light gathering portion 211, and an outer surface of the first light gathering portion 211 is bent towards a side away from the light source 1 to form a lens shape similar to a hemisphere. Therefore, light beams emitted by the light source 1, after being emitted in the first direction, are focused after passing through the first light gathering portion 211, thereby making the lamp to have an effect of gathering light to brighten up.

Figure 8:
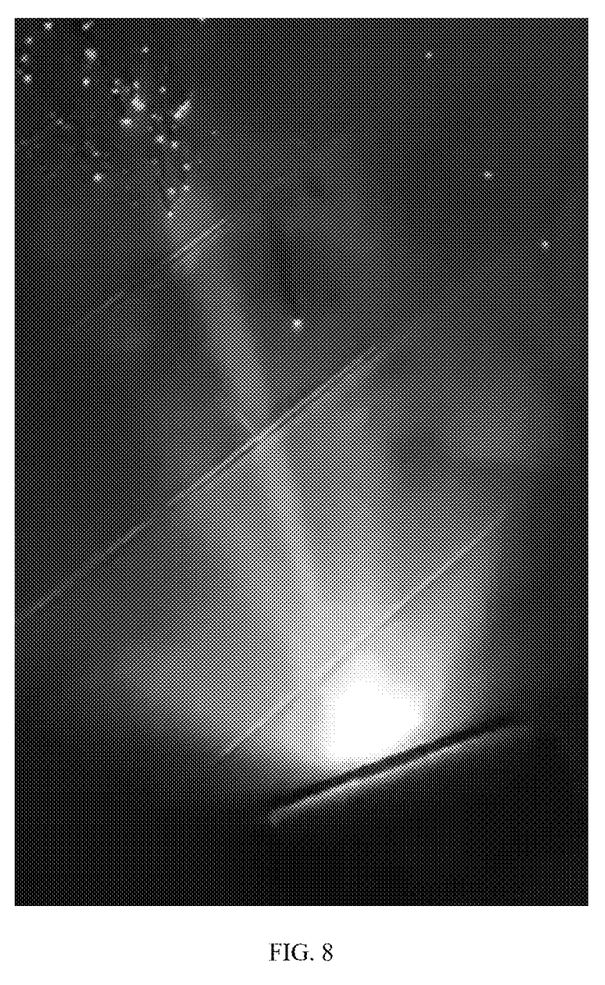
FIG. 8 is a first diagram of an effect of illuminating floor dust by a vacuum cleaner head according to the present disclosure.
Figure 9:
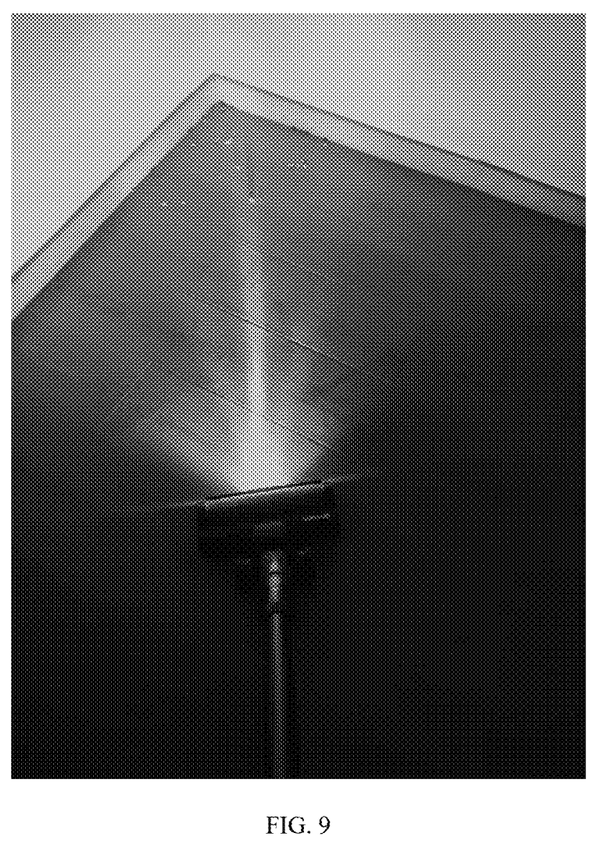
FIG. 9 is a second diagram of an effect of illuminating floor dust by a vacuum cleaner head according to the present disclosure.

Since the lampshade 21 of the vacuum cleaner head 4 has a structure of a light gathering cavity 2121, the light beams emitted from the light source 1 can be further gathered under the action of an inner side wall of the light gathering cavity 2121, so that the light beams emitted outwardly from a direction of an opening of the light gathering cavity 2121 are sufficiently gathered, and thus the light beams emitted from the light source 1 can be more gathered by the combined action of the first light gathering portion 211 and a second light gathering portion 212 and can be emitted from the end of the light gathering cavity 2121 away from the light source 1. When the same light source 1 is used, the light beams of the light source of the present embodiment are more gathered and have a longer range, and therefore, the present application can make a single light beam emitted from the vacuum cleaner head 4 brighter only by using a common light source without the need to dispose a specialized laser lamp, so that an illumination region in front of the vacuum cleaner head no longer exhibits a sheet-like illumination effect, but rather forms a number of very bright light beams (see FIG. 8 and FIG. 9), and thus the user can conveniently observe the fine-sized dust on the surface to be cleaned. In some implementations, the effect of diversified adjustment for the emitted light beams can be realized by changing a curvature of the outer surface of the first light gathering portion 211 or a relative position of an adjuster in the light gathering cavity 2121 or a diameter of the first light gathering portion 211, i.e., differentiation of the length of the range of the light beams and change of the diameters of light columns of the emitted light beams can be realized. Therefore, it is possible to meet the requirements for adjusting the emission state of the light source in a more diverse range of actual use environments.

In some implementations, a focal point of the first light gathering portion 211 is in the first direction, and thus it is ensured that the light beams emitted through the light source 1 are gathered and emitted in the first direction.

The quantity of the light source 1 in the present embodiment is n, n≥1, one lampshade 21 is disposed corresponding to each light source 1, and the quantity of values of curvature of the outer surface of each first light gathering portion 211 is greater than or equal to 1. Therefore, when the lamp is required to emit light beams with different ranges or brightnesses, the first light gathering portions 211 with different curvatures can be fabricated according to the actual use needs when the lampshade 21 is initially fabricated, and at the same time, a radius of the first light gathering portion 211 may also be changed, thereby realizing a diversified light beam emitting effect, so that the light beams have a certain staggered distribution effect, and thus the user can conveniently observe foreign objects in front of the lamp. Since the lampshade 21 is disposed on the protective cover 2 in the present application and the first light gathering portion 211 is located on the protective cover 2, the first light gathering portions 211 with a plurality of different curvatures can be conveniently fabricated or mounted.

Figure 10:
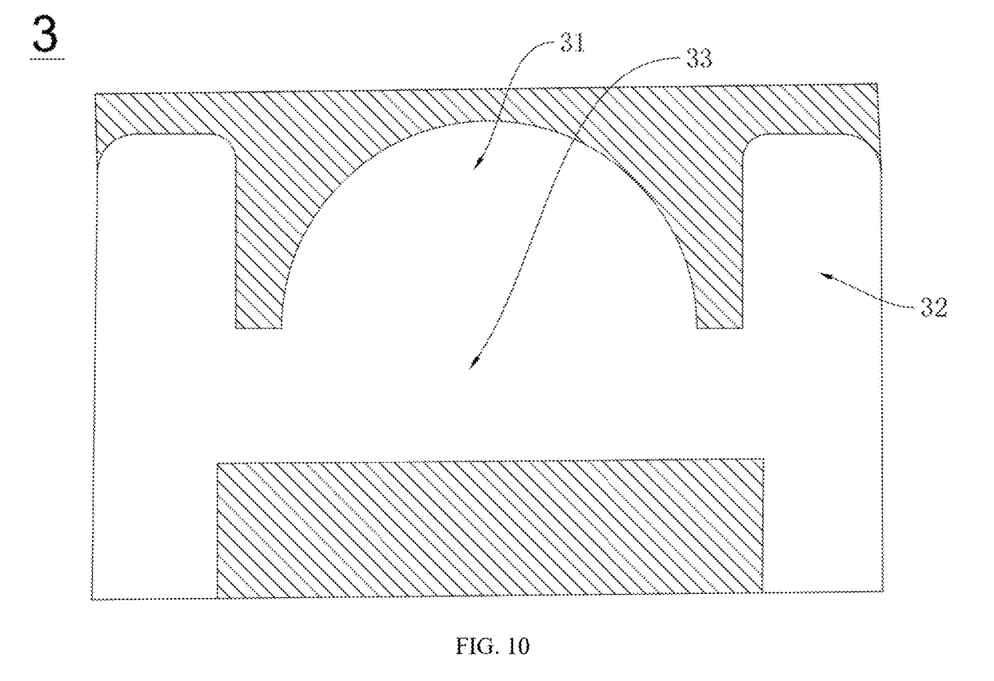
FIG. 10 is a schematic structural sectional view of a mold used for preparing a lamp of a vacuum cleaner head according to the present disclosure.
Figure 11:
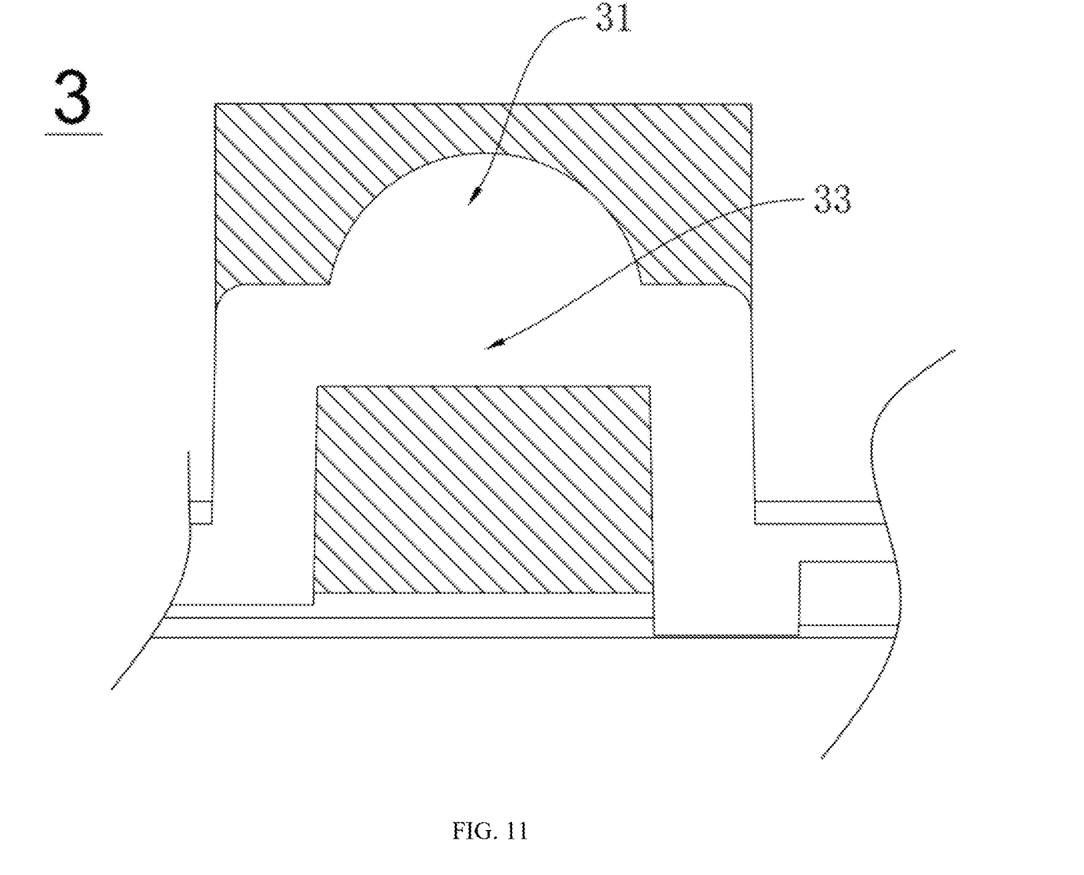
FIG. 11 is a schematic structural sectional view of a deformed manner of a mold used for preparing a lamp of a vacuum cleaner head according to the present disclosure.

In some implementations, the lampshade 21 may be integrally molded and connected to the protective cover 2, so that during the fabrication of the protective cover 2, the protective cover 2 having the structure of the lampshade 21 of the present application can be fabricated without having to separately affix a lens-shaped light gathering structure on the surface of the light source 1 and then dispose the protective cover 2 on the exterior of the light source 1 to which the light gathering structure has been affixed, thereby reducing the step of separately fabricating the light gathering structure of each light source 1 and also reducing the fabricating step of affixing the light gathering structure on a surface of the light source 1. For the form in which the lampshade 21 is integrally molded and connected to the protective cover 2, when the protective cover 2 is formed by injection molding, in the region of a mold 3 corresponding to the lampshade 21 of the first light source 1 thereof, a first light gathering cavity 31 of the lampshade 21 is reserved (see FIG. 10 and FIG. 11); and in the region of the mold 3 corresponding to the lampshade 21 of the second light source 1 thereof, a first light gathering cavity 31 of the lampshade 21 is reserved, and the two first light gathering cavities 31 can be provided in shapes corresponding to the first light gathering portions 211 with different curvatures, and the injection molding process of the protective cover 2 is not complicated. In addition, if the protective cover 2 is mounted on the outer side of the light source 1 after the light gathering structure is affixed to the surface of the light source 1, in order to avoid overlap between the protective cover 2 and the light gathering structure in the light beams emitted from the light source 1, which results in weakening the brightness and intensity of the light beams, the protective cover 2 is usually no longer provided with a cover structure in the region corresponding to the light source 1, and only an accommodating hole is provided for the light gathering structure to protrude. Therefore, due to gaps between the light gathering structure and the accommodating hole, dust easily enters the lamp and affects the service life of the lamp. The protective cover 2 of the present embodiment is located at a connecting edge of the lampshade 21 without forming a gap, thereby ensuring sufficient isolation of the light source 1 from the external environment and effectively reducing dust entering the lamp.

In other possible implementations, the lampshade 21 may also be in the form of being separately connected to the protective cover 2, in this case, a mounting hole for disposing the lampshade 21 is formed in the region of the protective cover 2 corresponding to the installation of the lampshade 21, and then the protective cover 2 is disposed in the mounting hole, which facilitates the flexible installation or more flexible replacement of the lampshade 21, and thus a more diversified light gathering effect of the light source 1 is met.

In some implementations, a distance between any one light source 1 and the corresponding lampshade 21 is d, and the quantity of values of d is greater than or equal to 1. Therefore, the light beams emitted through the lampshade 21 have different ranges or light beam gathering effects, which meets the requirements of more diversified applications of different emitted light beams. In some implementations, the light source 1 may abut against the lampshade 21, i.e., the light source 1 is adhered to an inner surface of the lampshade 21 to ensure that the light beams emitted from the light source 1 sufficiently enter the lampshade 21 and the light gathering and brightening effects are realized.

However, relying only on the structural form in which a lens is disposed on the front side of the light source 1, the effect of sufficiently gathering the light beams is still not met, thus resulting in the range of the light beams being still short and the brightness of the light beams still being insufficient. Therefore, in some implementations, the lamp of the present disclosure further includes a second light gathering portion 212, the second light gathering portion 212 is provided with a light gathering cavity 2121 extending in the first direction, the first light gathering portion 211 is disposed at an end of the light gathering cavity 2121 proximate to the light source 1, and a circumferential edge of the first light gathering portion 211 is connected to an inner wall surface of the light gathering cavity 2121 of the second light gathering portion 212. Therefore, the light gathering cavity 2121 is provided, so that scattered light beams which have not been completely gathered after passing through the first light gathering portion 211 are irradiated to the wall surface of the light gathering cavity 2121, and then form light beams which converge towards the center axis direction of the light gathering cavity 2121 after being reflected on the inner wall surface of the light gathering cavity 2121. Therefore, the light beams gathered through the first light gathering portion 211 are then formed into light beams that are more gathered and brighter under the action of the second light gathering portion 212.

In some implementations, a light gathering focal point of the first light gathering portion 211 is on an axial centerline of the second light gathering portion 212. Therefore, it is possible to ensure that the reflection through the light gathering cavity 2121 enables the light source 1 to have effects of a longer range and higher brightness.

In some implementations, the light gathering cavity 2121 has a length >0, and a circumferential edge of the second light gathering portion 212 is disposed on an inner cavity wall of the light gathering cavity 2121. Therefore, it is possible to cause the first light gathering portion 211 to be formed within the light gathering cavity 2121. Therefore, it is possible to continuously gather the scattered light beams that remain after being reflected by the first light gathering portion 211 in the direction of an axial centerline of the light gathering cavity 2121 after being reflected at the inner cavity wall of the light gathering cavity 2121, thereby realizing the effect of gathering the light beams. The longer the distance between the first light gathering portion 211 and the end of the light gathering cavity 2121 away from the light source 1, the better the effect of gathering the light beams.

In some implementations, the first light gathering portion 211 is located in the light gathering cavity 2121. That is, the distance between the circumferential edge of the first light gathering portion 211 and the end of the light gathering cavity 2121 away from the light source 1 is greater than 0. Therefore, the light gathering cavity 2121 can sufficiently gather the light beams 211 scattered through the first light gathering portion 211 and then the light beams are gathered and emitted from the end 1 of the light gathering cavity 2121 away from the light source 1. In some implementations, the whole protrusive lens-shaped structure face of the first light gathering portion 211 is located in the light gathering cavity 2121. Therefore, the light gathering cavity can fully reflect the scattered light beams that are refracted by the first light gathering portion 211, and thus the lamp as a whole creates light beams with a longer irradiation distance and higher brightness.

In some implementations, at least an inner cavity wall of the light gathering cavity 2121 is made of a reflective material. Here, it does not mean that a specialized reflective coating or other material needs to be specially disposed on the inner cavity wall of the light gathering cavity 2121, as long as it is ensured that the inner cavity wall of the light gathering cavity 2121 has the light reflecting property. For example, by using an opaque material to prepare the light gathering cavity 2121, or by using an opaque material to prepare the inner cavity wall of the light gathering cavity 2121, the effect of the light gathering cavity 2121 to reflect the light beams scattered through the first light gathering portion 211 and continuously gather the light beams towards the center axis direction may be realized.

In some implementations, each light source 1 of the lamp is a green light, and thus can have a better irradiation effect on the ground dust, so that the dust is brightly illuminated, and the user can clearly and conveniently see the dust.

Figure 5:
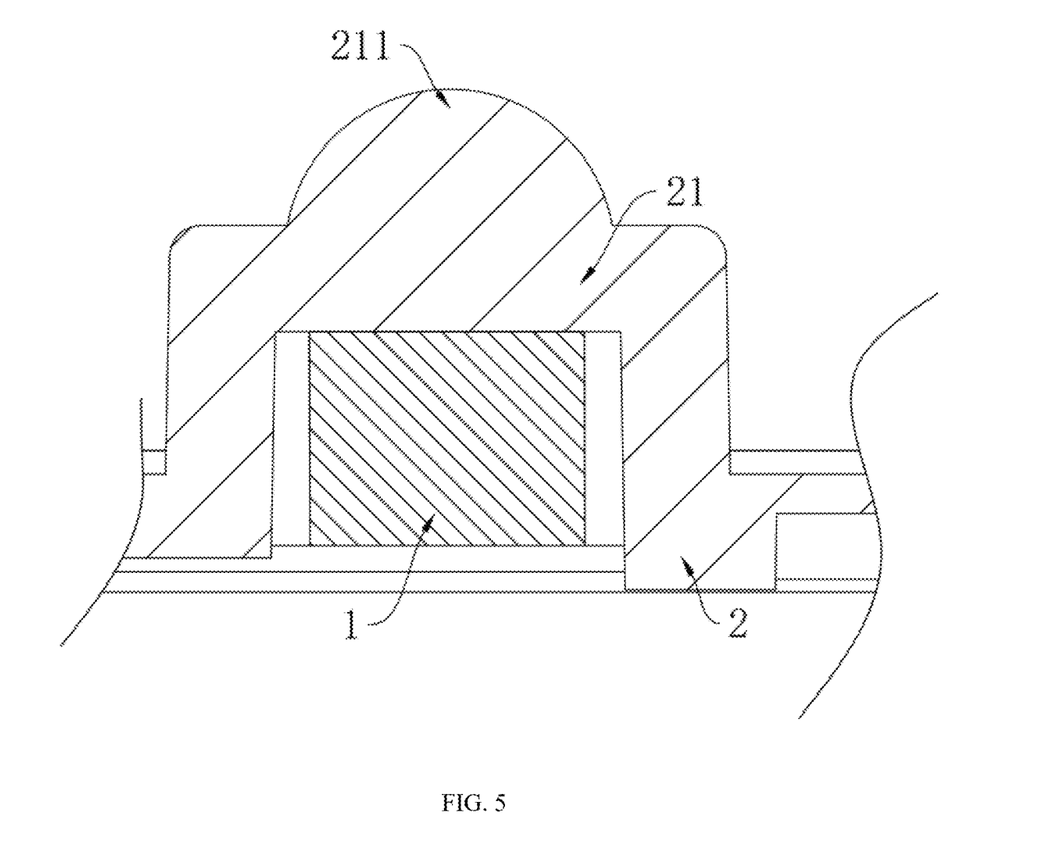
FIG. 5 is a schematic structural sectional view of a deformed manner of a lamp of a vacuum cleaner head according to an embodiment of the present disclosure.
Figure 6:
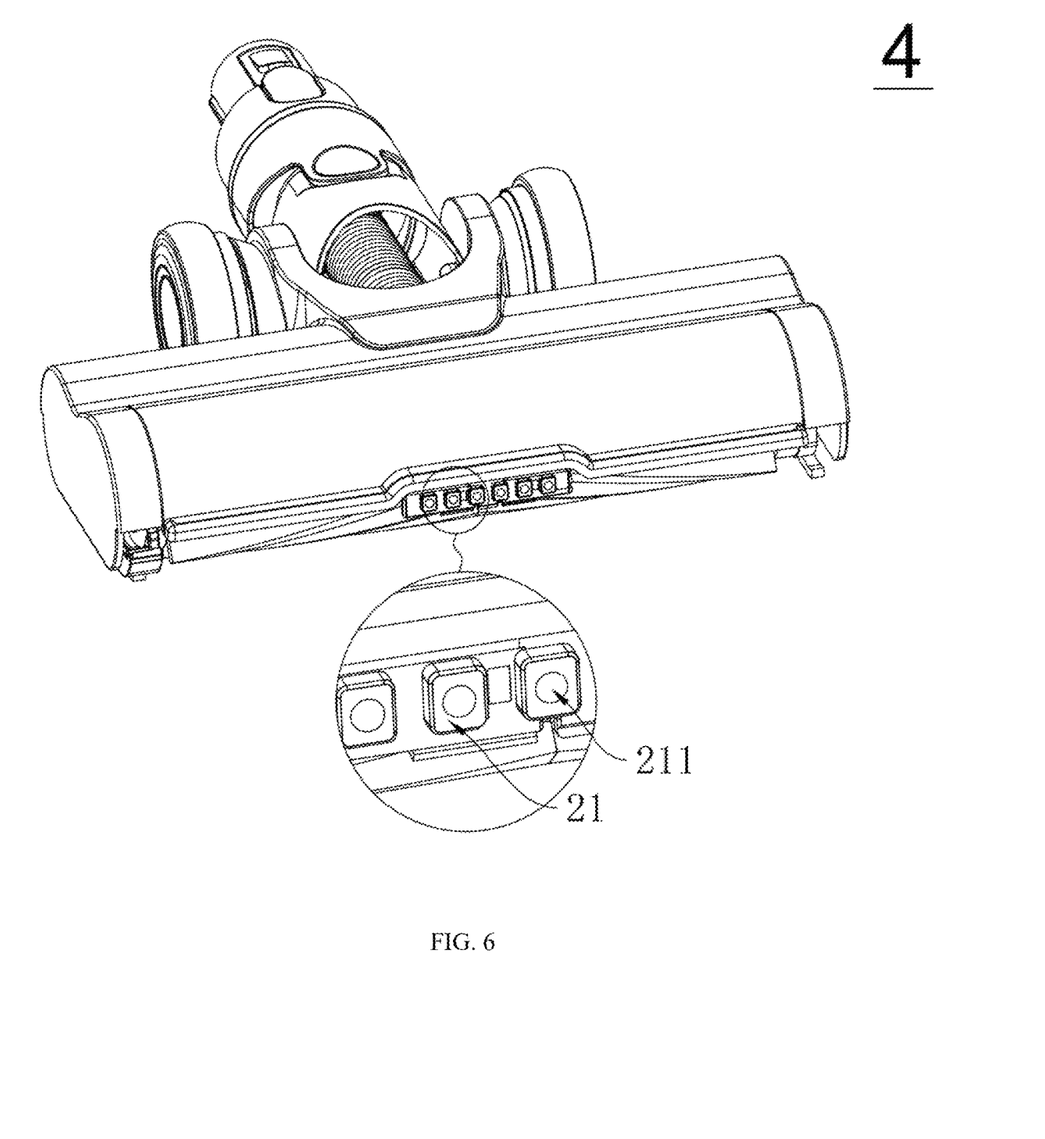
FIG. 6 is a schematic stereoscopic structural diagram of a deformed manner of a vacuum cleaner head according to the present disclosure.

In other possible implementations, FIG. 5 and FIG. 6 show a case where a deformed lamp structure is disposed on the vacuum cleaner head 4. The light gathering cavity is no longer provided, but only the circumferential edge of the first light gathering portion 211 is disposed on the outer surface of the lampshade 21, so that the first light gathering portion 211 is shaped to protrude outwardly from the surface on a side of the lampshade 21 away from the light source 1. In some implementations, a light gathering and brightening effect is achieved by directly forming a hemispherical lens structure protruding in a direction away from the light source on the outer surface of the lampshade 21.

Since the first light gathering portion 211 is formed on the lampshade 21, fabrication of the first light gathering portion 211 can be synchronized when the lampshade 21 is fabricated, and since the lampshade 21 is on the outside of the light source, the first light gathering portion 211 is convenient to dispose or adjust. In addition, by disposing the first light gathering portion 211 and the lampshade 21 to be integrally connected (note that herein, the form in which the first light gathering portion 211 and the lampshade 21 are disposed as an integral structural member (e.g., integrally injection molded) is included; and the structural form in which the first light gathering portion 211 and the lampshade 21 are separated members may also be included, but since the first light gathering portion 211 is located on the outer surface of the lampshade 21, the first light gathering portion 211 is convenient to dispose or adjust), no gap will be formed at the connection between the first light gathering portion 211 and the lampshade 21, thereby ensuring sufficient isolation of the light source 1 from the external environment, and effectively reducing dust entering the lamp.

In some implementations, the aforementioned vacuum cleaner head is mounted on the vacuum cleaner to form the vacuum cleaner as a whole.

The above implementations are intended only to illustrate the technical concepts and features of the present disclosure, and its purpose is to enable those skilled in the art to understand the content of the present disclosure and implement it, but it cannot limit the protection scope of the present disclosure. Any equivalent changes or modifications made in accordance with the spirit of the present disclosure shall be covered by the protection scope of the present disclosure.

The invention claimed is:

1. A vacuum cleaner head, comprising a lamp, the lamp being disposed on a front side of the vacuum cleaner head, the lamp comprising at least one light source and a protective cover disposed on an outer side of each of the at least one light source, and each of the at least one light source being disposed in a width direction of a vacuum cleaner, wherein the lamp further comprises at least one lampshade disposed on a front side of the at least one light source, each of the at least one light source and a corresponding one of the at least one lampshade are disposed sequentially in a first direction, the at least one lampshade is disposed on the protective cover, each of the at least one lampshade comprises a first light gathering portion, an outer surface of the first light gathering portion is bent towards a side away from a corresponding one of the at least one light source, the quantity of the at least one light source is n, n≥1, the corresponding one of the at least one lampshade is disposed corresponding to each of the at least one light source, and when n>1, a quantity of the first light gathering portion is two or more, curvatures of outer surfaces of two or more first light gathering portions are the same or different.

2. The vacuum cleaner head according to claim 1, wherein a distance between each of the at least one light source and the corresponding one of the at least one lampshade is d, and d is greater than or equal to 1.

3. The vacuum cleaner head according to claim 1, wherein the lamp further comprises at least one second light gathering portion, each of the at least one second light gathering portion is provided with a light gathering cavity extending in the first direction, the first light gathering portion is disposed at an end of the light gathering cavity proximate to the corresponding one of the at least one light source, and a circumferential edge of the first light gathering portion is connected to the light gathering cavity.

4. The vacuum cleaner head according to claim 2, wherein the lamp further comprises at least one second light gathering portion, each of the at least one second light gathering portion is provided with a light gathering cavity extending in the first direction, the first light gathering portion is disposed at an end of the light gathering cavity proximate to the corresponding one of the at least one light source, and a circumferential edge of the first light gathering portion is connected to the light gathering cavity.

5. The vacuum cleaner head according to claim 3, wherein the first light gathering portion is located inside the light gathering cavity.

6. The vacuum cleaner head according to claim 4, wherein the first light gathering portion is located inside the light gathering cavity.

7. The vacuum cleaner head according to claim 3, wherein at least an inner cavity wall of the light gathering cavity is made of a reflective material.

8. The vacuum cleaner head according to claim 4, wherein at least an inner cavity wall of the light gathering cavity is made of a reflective material.

9. The vacuum cleaner head according to claim 1, wherein a circumferential edge of the first light gathering portion is disposed on an outer surface of the lampshade.

10. The vacuum cleaner head according to claim 2, wherein a circumferential edge of the first light gathering portion is disposed on an outer surface of the lampshade.

* * * * *